United States Patent

[11] 3,578,367

[72] Inventors Leonard A. Harvill
  Santa Ana;
  William E. Duncan, Garden Grove, Calif.
[21] Appl. No. 857,293
[22] Filed Sept. 3, 1969
[45] Patented May 11, 1971
[73] Assignee Hi-Shear Corporation
  Torrance, Calif.
  Continuation of application Ser. No.
  713,658, Mar. 18, 1968, now abandoned.

[54] FASTENER INCLUDING EXPANDER MEANS AND JOINT INCLUDING THE SAME
  11 Claims, 9 Drawing Figs.
[52] U.S. Cl. ............................................. 287/189.36,
  85/1, 151/41.73
[51] Int. Cl. ........................................... F16b 5/02
[50] Field of Search ............................. 287/189.36,
  189.36 (F); 85/9, 37, 5, 8.8, 1, 46; 151/41.73;
  72/377, 464

[56] References Cited
UNITED STATES PATENTS

| | | | |
|---|---|---|---|
| 2,522,440 | 9/1950 | Freten | 72/464 |
| 2,531,048 | 11/1950 | Huck | 85/5 |
| 2,755,698 | 7/1956 | Wunzel | 85/8.8 |
| 2,895,367 | 7/1959 | Nagy | 85/1 |
| 2,972,274 | 2/1961 | Bombard et al. | 85/5 |
| 3,369,440 | 2/1968 | King | 85/37 |
| 3,434,327 | 3/1969 | Speakman | 72/377 |

Primary Examiner—Edward C. Allen
Attorney—Angus and Mon

ABSTRACT: This invention relates to a fastener pin for making an interference fit with the cylindrical wall of a hole in a metal workpiece, and to a joint produced by this fastener pin together with the metal workpiece. During the insertion of the fastener pin into the hole, a temporary and localized expansion of the wall to a diameter greater than that of the shank with which the interference fit will be formed is caused. This temporary and localized expansion is to such an extent that the metal immediately surrounding the hole where the localized expansion occurs is compressed beyond its compressive yield point, after which at least a portion of the axial extent of the wall of the hole is permitted to return toward its original diameter, thereby to embrace in an interference fit at least a portion of the pin. The joint produced by this technique enjoys the benefits of having worked the material surrounding the pin in its plastic range, after which it is permitted to return to make the interference fit. This enables the wall of the hole to be burnished, to be made more truly cylindrical, and to reduce the compressive hoop force on the fastener pin with the correlative effects of reducing stress corrosion in the joint and of reducing galling and damage to the plating on the shank of the pin.

PATENTED MAY 11 1971 3,578,367

INVENTOR.
LEONARD A. HARVILL,
WILLIAM E. DUNCAN
BY
Angus & Mon
ATTORNEYS.

3,578,367

1

FASTENER INCLUDING EXPANDER MEANS AND JOINT INCLUDING THE SAME

CROSS-REFERENCE TO RELATED APPLICATIONS

This application is a continuation of applicant's copending U.S. Pat. application Ser. No. 713,658, filed Mar. 18, 1968, and now abandoned.

This invention relates to a fastener pin for making an interference fit with the nominally cylindrical wall of a hole in a metal workpiece, and to the resulting joint.

Especially in the aircraft field, but not exclusively therein, it has become increasingly important to utilize a fastener in a joint which provides optimal strength, together with least physical interruption of the workpiece itself. Concomitantly, it has become critically important not only to design to the classical considerations of tensile, shear and bearing strengths, but also to consider the effects on the workpiece itself of its interaction with the fastener. One reason for this is the proportional relationship between stress corrosion and the compressive (hoop) stress exerted by the workpiece on the fastener. Still another is resistance to fatigue, or cyclic failure. A tight joint is more fatigue resistant than a relatively looser one, and fatigue strength is a major factor in aircraft longevity.

As a current example, in the Boeing 747 airplane, the airplane is expected to take off with a loaded gross weight of approximately 600,000 pounds. The tare weight of the airplane itself is expected to be on the order of 375,000 pounds. It will thereby be noted that this modern airplane is expected to lift a payload of approximately the same order of magnitude as its own weight. Not only does this require highly stressed joints and structural members performing to their optimal characteristics, but it must be expected that these joints will be cycled many times. The aircraft will cost many millions of dollars, and its commercial life must be long. It is stipulated that its life cycle will have to be approximately four times longer than those of military aircraft to be economically feasible.

The joints which are to perform under the circumstances indicated will in general have to be very tight ones, including substantial clamping forces, and even more importantly, involving tight fits between the shank of the fastener and the wall of the hole in which it fits. One typical example of a close-tolerance fit for this purpose is called the interference fit, wherein the diameter of the shank of a fastener is greater than the nominal diameter of the hole in which it is to be fitted. Interference fits are not new per se, and are frequently utilized where a tight fit is desired between the workpiece and the shank. Such fits have involved a number of very serious problems in the past, not the least of which results from the standards of workmanship to which the holes are drilled, and to which the fasteners themselves are formed. If the interference is too great, then it is possible to damage the workpiece into which the shank is forcibly thrust. Also, the springback force of the workpiece will be excessive, and lead to increased stress. Stress corrosion is a problem in all interference fits and increases with the hoop force. It is therefore desirable to have reduced hoop force on the fastener, but still to have a tight fit.

Still another problem resides in the surface finish of both the hole and of the fastener itself. Surface irregularities become stress concentration regions wherein fatigue failures resulting from many hundreds of thousands of cycles are likely to cause incipient failures.

It is an object of this invention to provide a means for making an optimum interference fit wherein the hoop forces between the wall of the workpiece and the fastener are reduced while still providing a good tight fit, in which the structural properties of the material of the wall are modified favorably, in which the hole in the workpiece is optimally rounded out, and in which the same wall is burnished so as to provide a smooth finish for engagement with a smooth, truly cylindrical shank.

It is a further object of this invention to provide a joint wherein a fastener can be plated with a relatively delicate material, in which the frictional forces between the wall of the hole in the workpiece and the plating are reduced, whereby the plating which remains contiguous between the wall of the workpiece and the general structure of the fastener pin along the shank is maintained in an optimal condition.

This invention contemplates a fastener pin for making an interference fit with the cylindrical wall of a hole in a metal workpiece and for causing, during the insertion of the pin into the hole, a temporary and localized expansion of the wall to a diameter greater than that of the shank with which the interference fit will be formed, and to such an extent that the metal immediately surrounding the hole where the localized expansion occurs is compressed beyond its compressive yield point, after which at least a portion of the axial extent of the wall of the hole is permitted to return toward its original diameter, thereby to embrace in an interference fit at least a portion of said pin. The pin includes a cylindrical shank, a head on the pin on the first end thereof, and fastening means at the other end thereof. The fastening means has a maximum lateral dimension no greater than the diameter of the hole through which it is to be passed, and the shank has a diameter which is greater than the said diameter of the hole. A deflector section is disposed adjacent to the fastening means which constitutes a surface of revolution in the zone between the lateral dimension and the said shank diameter. The tangent to the generator line of the surface of revolution makes an acute angle with the central axis, which acute angle faces toward the headed end. The deflector section is free from discontinuities.

An expander section is in the nature of a bead or rim extending circumferentially around the fastener disposed between the deflector section and the shank. The deflector section comprises a solid annular projection extending to a diameter greater than that of the shank diameter. Thus, as the pin is forced into the hole in the workpiece, the fastening means passes through the hole without interference. The deflector section enlarges the hole to at least the diameter of the shank, and the expander section thereafter enlarges the hole further, locally compressing the material beyond its yield point and, as the expander section moves beyond the locally expanded region, the expanded material contracts upon the shank to form an interference fit therewith, at least some physical properties of the metal at the wall of the hole being different than those which would have resulted had the interference fit with the shank been formed without the said localized expansion.

The invention also comprehends the joint produced by said fastener with the workpiece, together with additional fastening means such as threaded, headed, or attachments, which bear against one side of the workpiece while the head of the fastener pin bears against the other side of the workpiece.

The above and other features of this invention will be fully understood from the following detailed description and the accompanying drawings, in which.

Figure 1:
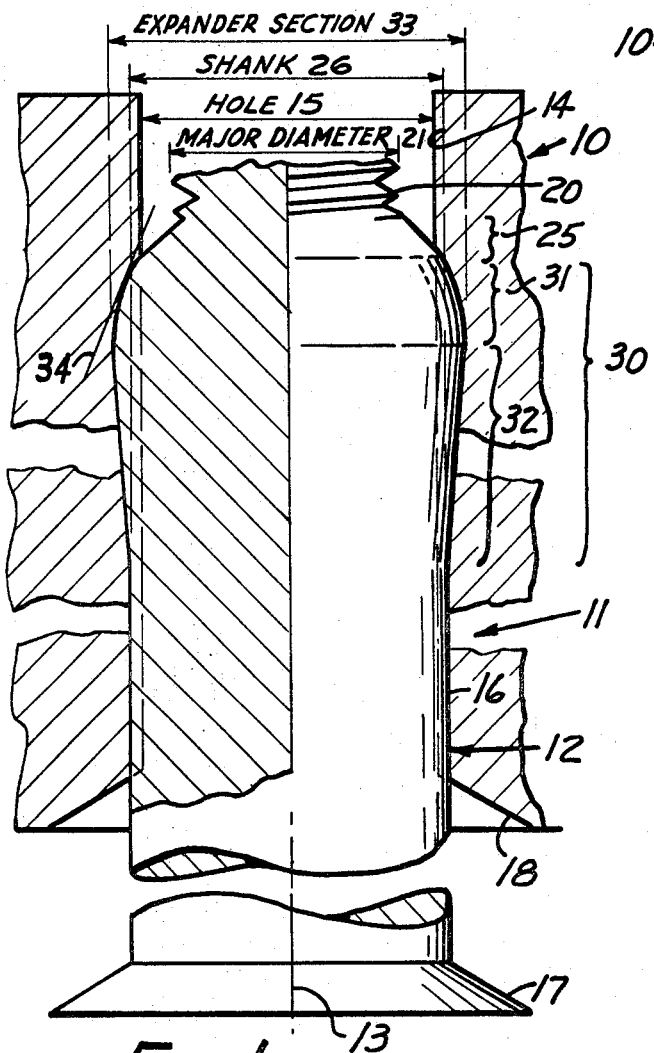
FIG. 1 is a side elevation of the presently preferred embodiment of the invention showing a portion of the fastener entering a workpiece preparatory to making a joint according to the invention.

The invention as shown in FIG. 1 includes a metal workpiece 10 which may comprise a plurality of pieces such as sheets or a sheet and a bracket to be joined together by a fastener 11, which fastener 11 includes a pin 12. The pin has a central axis 13 which is intended to be aligned with the axis of a hole 14 extending through the workpiece into which the pin is to be inserted. The hole has a nominal diameter 15 which is the diameter of the hole in its relaxed and undisturbed condition. Other diameters are also shown which will be further described below.

The fastener pin includes a circularly cylindrical shank 16 which is sometimes described as a "straight shank," being a pure cylinder on central axis 13. At one end of the shank there is a head 17 which is shown as a typical countersink type intended to fit in a countersink 18 in the workpiece. It will, however, be understood that other types of heads such as flat heads, fillister heads, and the like could be used instead, in which cases the countersink will be eliminated from the workpiece.

At the opposite end of the pin there is a fastener means 20 which in the preferred embodiment shown is a thread. The thread has a major diameter 21 which is greatest diameter of the thread. This major diameter is less than the nominal diameter 15 of the hole so that it will pass freely through the hole. The relationships between the various dimensions in FIG. 1 have been magnified and exaggerated for purposes of illustration.

It will also be noted that the diameter 26 of the cylindrical shank 16 is greater than the nominal diameter 15 in order that there will be an interference fit between the circular shank and the wall of the hole. Because it is desired to insert the cylindrical shank into the cylindrical wall of hole 14 with an interference relationship, it is obviously necessary to expand the wall of the hole in order to get the shank into it. In order to do so, with the least damage to the workpiece and to the maximum advantage of the resulting joint, there is provided a deflector section 25, which deflector section begins adjacent to the thread 21 at a region no farther radially outward than the diameter 21 of the thread, and which continues in a generally convex or conical mode to a diameter which is at least as great as the diameter 26 of the shank. This deflector section is best shown in FIG. 1 as extending from diameter 21 to diameter 26 adjacent to the fastening means. Immediately contiguous to the deflector section, there is an expander section 30. This expander section is in two portions, an initial portion 31 which is contiguous to and continuous with the deflector section and a return portion 32 (sometimes herein called the "secondary portion" 32) which is contiguous to the initial portion and also to the straight shank.

The deflector section constitutes a surface of revolution in its zone, the tangent to its generator line making an acute angle with the central axis, which acute angle faces toward the head end. The deflector secton is free of discontinuities such as runout portions of the threads and the like. The expander section also is a surface of revolution and it comprises a solid annular projection extending to a diameter 33 which is greater than that of the shank diameter.

It is common practice for interference fits to involve a difference of diameter on the order of approximately 0.002 inch in holes of approximately ¼-inch nominal diameter. This interference dimension varies with the size of the hole involved, but these standards are generally known and followed in the trades, and are generally applicable to this invention.

Figure 8:
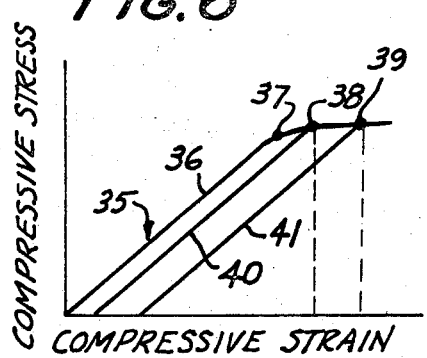
FIG. 8 is a stress-strain diagram illustrating a feature of the invention.

In the instant invention, it has been found important to attend to the class of physical property best illustrated in FIG. 8, which shows an illustrative example of a metal material having properties of compressive stress versus compressive strain. The diagram shown is generally typical of the aluminum alloy known as 2024 T 351. The dimensions of the compressive stress component are in pounds per square inch and those of compressive strain are in inches per inch. The typical and important portions of this overly simplified curve 35, which is also generally similar to curves for other metals and alloys, are a proportional region 36 which is essentially a straight line terminating at a yield point 37 beyond which there is a region with a different slope (often it is a curve) short of failure, in which, should the material be stressed beyond the yield point, for example to points 38 or 39, the material on the release of stress will return back down respective curves 40 or 41, the distinction representing residual effects in the nature of work hardening and the like which involve, among other things, a lesser residual or hoop stress on an article responsive to the residual strain. It is a feature of this invention that the expander section has its diameter 33 sufficiently large relative to the diameter 15 of the wall of the hole that when the fastener pin is pressed into the hole, there is a local compression of the material beyond its yield point, and, as the expander section moves beyond the locally expanded region, the expanded material contracts back upon the shank to form an interference fit therewith, at least some physical properties of the material of the wall of the hole being different from those which would have resulted has the interference fit with the shank been formed without the localized expansion beyond the yield point. This can readily be understood by reference to FIG. 8, where, if the material had been compressed by the expander section to points such as 38 or 39 on the curve, the material would have returned back onto the shank along curves 40 or 41 instead of along curve 36, thereby lessening the springback compressive hoop forces on the device itself while still enjoying certain advantages of burnishing and the like which are yet to be disclosed. In a fastener for a ¼-inch hole (diameter 15), a diametrical difference between diameters 33 and 26 on the order of 0.002 inch in a plate of 2024 T 351 aluminum has been found to provide the aforesaid advantages.

The initial portion 31 is preferably a continuous circular curve in an axial length on the order of about 0.023 inch. The secondary portion 32 is preferably a conical taper on the order of two degrees included conical angle and on the order of 0.060 inch in length. The deflector and expander sections are preferably continuous with each other, blending without discontinuity. The generator line of the initial portion has a tangent tending, between the fastening means and the secondary portion, to merge toward parallelism with the central axis. The secondary portion and the initial portion are preferably continuous with each other, so as to merge without a sharp discontinuity, and they are contiguous to one another, and the second portion meets the cylindrical shank at a small angle of about 2° included conical angle. The secondary (or return) portion thereby constitutes that part of the expander section which is not defined as the initial portion. In other words, the return portion starts where the initial portion stops. The generator of the initial portion (a "generator" being a line which is revolved around a central axis to generate a surface or revolution) is preferably, but not necessarily a continuous convex arc. Its shape is such that the resulting initial portion is "smooth" in the sense that it is without such discontinuities as would tend to broach or cut, rather than to expand the wall of the hole. The diameter of the initial portion "progressively increases" in the gross sense that is defines a generally enlarging section, whose diameter is generally greater as the axial distance increases from the fastener means. However, the term "progressively increases" does not necessarily means "continuously increases" (although that is the situation in the preferred embodiment), and it does not necessarily mean that this diameter must increase from every axial location to the next axial location on the side nearer the head.

The term "sloping" has been applied to both the initial and return portions. This is intended to define a gross construction wherein the diameter changes from one end of the portion to the other, but it is not intended to be limited to one in which the change of diameter is either continuous or uniform from end to end although one of such arrangement will be found in each of the portions of the illustrated preferred embodiment (FIG. 1), and is therefore contemplated by the invention.

Figure 9:
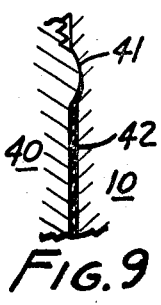
FIG. 9 is a schematic, fragmentary, cross section illustrating a feature of the invention.

An advantage of the invention is illustrated in FIG. 9, wherein a shank 40 and an expander section 41 are shown which bear a plating 42 of cadmium or other relatively soft plating material Such materials can also be of silver, aluminum and various of the noble metals. It is noted that in general these platings are galled in interference fits, generally in proportion to the springback forces exerted by the wall of the hole. By minimizing these springback forces it will be found that the plating between the shank and the wall of the hole is left relatively undisturbed and smooth and will be in better shape than were the expander section not provided. It is generally and schematically shown in FIG. 9 that there is a region 43 where the plating is removed from the expander section because this is the region where the roughest treatment is exerted between the workpiece and the fastener pin. However, this expander section also serves to expand and burnish the wall of the hole and also modify the physical property of the springback of the material such that as the material returns back to embrace the shank, the springback force is less than it would have been had the expander portion not stressed the wall of the hole beyond the yielded point. The result of this is that there is a lesser frictional drag between the wall of the hole and the plating, and consequently there is less damage to the plating on the shank. There is a still further advantage in the use of the expander section. The fastener can readily be turned or ground to a true circular section. By expanding all of the wall material contiguous to the hole to a condition beyond its yield point, it will be found that all of this material, then being in the plastic range, will return back to approximately a true circular diameter, namely that of the shank, whereby a hole which is initially somewhat slightly out of round in the workpiece will actually return to a true round configuration and smoothly and evenly embrace the cylindrical shank of the fastener pin.

Figure 2:
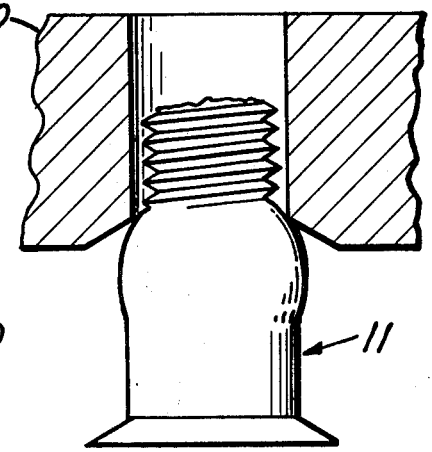
FIG. 2 is a side elevation partly in cutaway cross section showing a first stage in the manufacture of the joint of FIG. 1.
Figure 3:
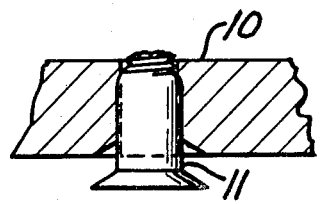
FIG. 3 shows the result of further insertion of the device of FIG. 1 into the workpiece.
Figure 4:
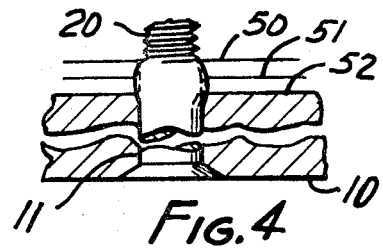
FIG. 4 shows the device of FIG. 1 fully inserted into the workpiece and further illustrates some considerations relating to grip range.
Figure 5:
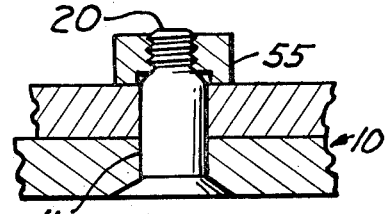
FIG. 5 shows the presently preferred joint of the invention.

The use of this device is shown in FIGS. 1—4. The first step is shown in FIG. 2 with the fastener means inserted into the hole in the workpiece and the bottom end of the workpiece hole just beginning to bear on the deflector section. As the fastener pin is thrust further in, the conditions of FIG. 3 begin to occur wherein the material is deflected by the deflector section, and then is further expanded by the expander section, and then begins to contract on the secondary portion of the expander section and upon the cylindrical shank. FIG. 4 shows the consideration of grip range. It is preferred, of course, that the entire length of the wall of the hole be treated, but this is not necessary. For example, the maximum grip range is indicated by line 50, a medium grip range by line 51, and a minimum grip range by line 52. These represent the back surfaces of workpieces of different thicknesses, the dimensions being greatly exaggerated for purposes of illustration. FIG. 5 shows the device more in context. The total length of the expander and deflector sections will ordinarily not exceed 0.10 inch on a fastener of practical diameter, and it will therefore be understood how exaggerated the drawings are. However, without such exaggeration, the major features could not be illustrated at all.

Maximum grip would have the end of the hole immediately adjacent the fastening means. Minimum grip would have the expander section passed entirely through the workpiece, and medium grip would place its midsection at the back of the hole. The axial extent of treated hole wall which returns to shank diameter obviously can vary.

The fastener means also includes an additional means which will hold the fastener pin in the workpiece. This is illustrated in FIG. 5 as a nut 55 threaded onto the fastening means, the nut having a counterbore 56 to clear any incomplete threads on the fastening means and also any projecting portion of the deflector and expander portions.

Figure 6:
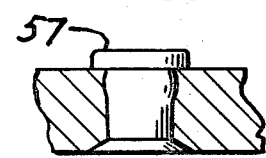
FIGS. 6 and 7 are side elevations, partly in cutaway cross sections, of other embodiments of the invention.
Figure 7:
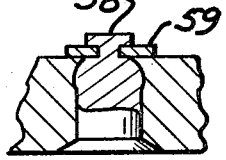

Threaded means are not the only way to hold the device together. For example, FIG. 6 shows that instead of the fastener means portion at the end of the pin being threaded or otherwise formed, it could be made of material suitable to be headed to a head 57 such as by being struck with a hammer or rivet gun. FIG. 7 shows the use of a ring groove 58 with a snap ring 59 or other means engaged therein. The fastener means is in every case completed by a means either of the self material or of an auxiliary part which bears against one side of the workpiece while the head bears against the other side.

This invention thereby provides optimum functions resulting from working the material of the workpiece in its plastic range to treat the wall of the hole in which the fastener pin is to be fitted by placing it in compression beyond its yield point so as to reduce the hoop stresses on the material as it returns to form an interference fit, thereby doing less damage to plating on the devices, smoothing and burnishing the wall of the hole, and generally beneficially treating the material of both the fastener and of the wall of the workpiece so as to produce a joint of optimum properties.

We claim:

1. A structural joint comprising: a workpiece having a pair of opposite surfaces comprised of a plurality of overlapping contiguous metal elements, each of the elements having a respective hole, the holes being axially aligned to form a continuous passage extending between said surfaces defined by respective walls of the holes and having a central axis, the metal of which the elements are made having the inherent physical property of a compressive stress-compressive strain relationship in which a yield point exists such that, when compressive forces are exerted beyond said yield point and are then relaxed, the material returns to a different strength and size than would result were the yield point not exceeded, and is said to be "cold-worked"; a unitary metallic combined metalworking tool and fastener pin in the said hole comprising a cylindrical shank having a central axis coincident with that of the passage, a solid annular expander section on said pin contiguous to the cylindrical shank and extending radially beyond the shank, fastener means at one end of the fastener pin, and a head at the other end, said expander section including an initial portion which is a smooth surface of revolution facing and sloping toward the fastener means with a progressively increasing diameter as it extends axially away from said fastener means, and a return portion contiguous and directly connected to both the initial portion and to the cylindrical shank, and having no diameter less than that of the cylindrical shank, the return means facing and sloping toward the head, the expander section lying closer to the fastener means than the cylindrical shank, and having a greatest diameter greater than that of the cylindrical shank, the head bearing against the workpiece surface at one end of the passage, the expander section having adjacent to the other end of the passage, some part of the expander section having contacted the passage wall at the said other end and the major portion of the axial length of the walls of the holes forming an intimate and substantially continuous interference fit with the cylindrical shank, and the fastener means including means in abutment with the workpiece surface as said other end of the passage, the joint having been produced by selecting the said greatest diameter of the expander section relative to the initial diameter of the passage so that expansion of the wall to the diameter of the expander section by expansive force exerted by the expander section will coldwork the metal which bounds said wall, and upon release of said expansive force, the wall would, absent restraint, return to a new diameter which is larger than the initial diameter of the passage prior to exertion of said expansive force and smaller than that of the expander section, and selecting the diameter of the cylindrical shank so as to be greater than said new diameter, and pressing the fastener pin into the passage until the fastener means projects beyond said other end of the passage and the head bears against the workpiece surface at said one end of the passage, thereby passing the expander section axially through the major portion of the length of the passage, burnishing said walls on the way, and inserting the cylindrical shank in the passage in intimate and substantially continuous interference fit with the workpiece throughout the major proportion of the axial length of the holes without further expansion of the walls after passage of the return portion, the metal of the workpiece contiguous to the cylindrical shank being coldworked by the expander section and thereby having a greater tensile strength than material laterally farther removed from the passage.

2. A structural joint according to claim 1 in which the said greater tensile strength of material contiguous to the cylindrical shank is substantially uniform axially throughout the said major portion of the axial length of the holes.

3. A structural joint according to claim 1 in which the fastener means includes a thread on the said combined metalworking tool and fastener pin.

4. A structural joint according to claim 1 in which the fastener means includes a recess in the said combined metalworking tool and fastener pin for receiving and retaining a laterally-extending element.

5. A structural joint according to claim 1 in which the fastener means comprises a deformable section on the said combined metalworking tool and fastener pin for forming an upset head.

6. A structural joint according to claim 1 in which the combined metalworking tool and fastener pin includes a deflector section between the fastener means and the initial portion having a diameter less than that of the cylindrical shank, the deflector section and initial portion being contiguous and without discontinuity between them.

7. A structural joint according to claim 6 in which the generator of the initial portion of the expander section bends toward parallelism with the central axis.

8. A structural joint according to claim 1 in which the generator of the initial portion of the expander section bends toward parallelism with the central axis.

9. A structural joint according to claim 1 in which the generator of the initial portion is a continuous convex arc.

10. A structural joint according to claim 9 in which the return portion is a frustoconical taper.

11. A structural joint according to claim 9 in which the return portion is nonconcave.

Hi-Shear 0-1555C

UNITED STATES PATENT OFFICE
CERTIFICATE OF CORRECTION

Patent No. 3,578,367                    Dated May 11, 1971

Inventor(s) Leonard A. Harvill and William E. Duncan

It is certified that error appears in the above-identified patent and that said Letters Patent are hereby corrected as shown below:

Column 3, line 59, "diameter" should be --diameters--

Column 4, line 17, "has" should be --had--
       line 57, "is" should be --it--
       line 60, "means" should be --mean--
       line 61, insert --"-- before "continuously"
       line 70, insert --,-- after "end" second occurrence Column 5, line 1, insert --.-- after "material"

Claim 1, line 39, change "means" to --portion--
      line 44, "having" should be --being--
      line 50, "as" should be --at--

Claim 11, line 16, "nonconcave" should be --non-concave--

Signed and sealed this 7th day of November 1972.

(SEAL)
Attest:

EDWARD M. FLETCHER, JR.                  ROBERT GOTTSCHALK
Attesting Officer                         Commissioner of Patents

UNITED STATES PATENT OFFICE
CERTIFICATE OF CORRECTION

Patent No. 3,578,367          Dated May 11, 1971

Inventor(s) Leonard A. Harvill and William E. Duncan

It is certified that error appears in the above-identified patent and that said Letters Patent are hereby corrected as shown below:

Column 6, line 45    "having" should be --being--

Signed and sealed this 23rd day of July 1974.

(SEAL)
Attest:

McCOY M. GIBSON, JR.          C. MARSHALL DANN
Attesting Officer             Commissioner of Patents